(12) United States Patent
Moran (10) Patent No.: US 12,017,601 B2
(45) Date of Patent: Jun. 25, 2024

(54) MOUNTING BRACKET FOR CURTAIN AIRBAG

(71) Applicant: ZF Passive Safety Systems US Inc., Washington, MI (US)

(72) Inventor: Dylan Moran, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/984,529

(22) Filed: Nov. 10, 2022

(65) Prior Publication Data

US 2024/0157907 A1   May 16, 2024

(51) Int. Cl.
*B60R 21/232* (2011.01)
*B60R 21/213* (2011.01)

(52) U.S. Cl.
CPC .......... *B60R 21/232* (2013.01); *B60R 21/213* (2013.01)

(58) Field of Classification Search
CPC .............................. B60R 21/232; B60R 21/213
See application file for complete search history.

(56) References Cited

U.S. PATENT DOCUMENTS

| 6,367,836 | B1* | 4/2002 | Tanase | B60R 21/2338 |
| | | | | 280/730.2 |
| 6,626,457 | B2* | 9/2003 | Masuda | B60R 21/232 |
| | | | | 280/730.2 |
| 7,159,896 | B2* | 1/2007 | Ochiai | B60R 21/201 |
| | | | | 280/730.2 |
| 7,264,267 | B2* | 9/2007 | Kino | B60R 21/2338 |
| | | | | 280/730.2 |
| 7,347,447 | B2* | 3/2008 | Nakanishi | B60R 21/2338 |
| | | | | 280/730.2 |

(Continued)

FOREIGN PATENT DOCUMENTS

CN  114435296 A  5/2022

OTHER PUBLICATIONS

PCT International Search Report for corresponding International Application Serial No. PCT/US2023/078778, mailed Mar. 18, 2024, pp. 1-11.

*Primary Examiner* — Jason D Shanske
*Assistant Examiner* — Joselynn Y Sliteris
(74) *Attorney, Agent, or Firm* — TAROLLI, SUNDHEIM, COVELL & TUMMINO L.L.P.

(57) ABSTRACT

A mounting bracket for a curtain airbag includes a mounting plate configured to be installed in a mounting tab of a curtain airbag. The mounting plate includes an opening for receiving a fastener. The mounting bracket also includes a deployment plate that is configured to be installed between folded portions of the curtain airbag and to maintain the folded configuration of the folded portions. The mounting bracket also includes an arm portion that connects the deployment plate to the mounting plate and maintains the deployment plate spaced from the mounting plate at a predetermined orientation relative to the mounting plate. The mounting bracket further includes a slot defined between the mounting plate and the deployment plate and having an open end adjacent corresponding lateral edges of the mounting plate and the deployment plate. The arm portion defines a closed end of the slot opposite the open end.

20 Claims, 6 Drawing Sheets

(56) References Cited

U.S. PATENT DOCUMENTS

| | | | |
|---|---|---|---|
| 7,523,958 B2 * | 4/2009 | Jang | B60R 21/213 |
| | | | 280/730.2 |
| 7,547,038 B2 * | 6/2009 | Coleman | B60R 21/213 |
| | | | 248/225.11 |
| 9,321,417 B1 * | 4/2016 | Lepper | B60R 21/201 |
| 9,573,550 B1 * | 2/2017 | Mitchell | B60R 21/213 |
| 10,005,419 B2 * | 6/2018 | Konaka | B60R 21/237 |
| 11,608,021 B2 * | 3/2023 | DiTrapani | B60R 21/232 |
| 11,628,796 B2 * | 4/2023 | Moran | B60R 21/213 |
| | | | 280/728.2 |
| 2004/0108693 A1 * | 6/2004 | Foster | B60R 21/213 |
| | | | 280/730.2 |
| 2007/0164544 A1 | 7/2007 | Fulmer et al. | |
| 2011/0316260 A1 | 12/2011 | Jaconelli et al. | |

* cited by examiner

MOUNTING BRACKET FOR CURTAIN AIRBAG

TECHNICAL FIELD

This disclosure to an inflatable apparatus for helping to protect a vehicle occupant in the event of a side impact to the vehicle and/or a vehicle rollover. More specifically, this disclosure relates to a mounting bracket for curtain airbags.

BACKGROUND

It is known to inflate an inflatable vehicle occupant protection device to help protect a vehicle occupant. One particular type of inflatable vehicle occupant protection device is a curtain airbag. The curtain airbag is inflatable away from the roof of the vehicle between a vehicle occupant and the side structure of the vehicle in response to a side impact to the vehicle and/or a vehicle rollover. A known curtain airbag is inflated from a deflated condition with inflation fluid directed from an inflator to the curtain airbag.

When installed in a vehicle, curtain airbags can be connected to the vehicle via mounting tabs that extend from an edge, such as an upper edge, of the curtain airbag. The curtain airbag is connected to the vehicle via fasteners that extend through the mounting tabs into the vehicle structure, such as a roof rail. The curtain airbag, when deployed, covers the side structure along the length of the vehicle, including doors/door frames, window openings, and pillars (A-pillar, B-pillar, C-pillar, etc.).

It is important for the curtain airbag to avoid obstruction from structures such as trim pieces on the roof rail and pillars, so that it can inflate and deploy properly. To this end, curtain airbags can be placed in the stored condition by rolling and/or folding the curtain airbag in a specific manner configured so that it avoids these structures.

SUMMARY

A mounting bracket for a curtain airbag includes a mounting plate configured to be installed in a mounting tab of a curtain airbag. The mounting plate includes an opening for receiving a fastener. The mounting bracket also includes a deployment plate that is configured to be installed between folded portions of the curtain airbag and to maintain the folded configuration of the folded portions. The mounting bracket also includes an arm portion that connects the deployment plate to the mounting plate and maintains the deployment plate spaced from the mounting plate at a predetermined orientation relative to the mounting plate. The mounting bracket further includes a slot defined between the mounting plate and the deployment plate and having an open end adjacent corresponding lateral edges of the mounting plate and the deployment plate. The arm portion defines a closed end of the slot opposite the open end.

According to one aspect, the arm portion can extend between and connect lateral edges of the mounting plate and the deployment plate opposite the open end of the slot.

According to another aspect, the deployment plate can include an opening for receiving a fastener. The mounting bracket can have a reversable configuration in which the identity of the mounting plate and the deployment plate is determined by which of the plates is installed in the mounting tab.

According to another aspect, the mounting plate and the deployment plate can have identical configurations.

According to another aspect, the arm portion can be configured to control the angle and orientation of the deployment plate relative to the mounting plate.

According to another aspect, the arm portion can be configured allow the angle and orientation of the deployment plate relative to the mounting plate to be adjusted to account for varying vehicle architectures.

According to another aspect, the deployment plate can be configured to be positioned outboard of the curtain airbag when the mounting plate is installed in the mounting tab.

According to another aspect, a lower portion of the mounting tab can be received in the slot when the mounting plate is installed in the mounting tab.

According to another aspect, an airbag module can include a curtain airbag inflatable away from a roof of a vehicle to a deployed position between a side structure of the vehicle and a vehicle occupant. The airbag module can also include an inflator actuatable to supply inflation fluid to the curtain airbag to inflate and deploy the airbag. The airbag module can further include the mounting bracket. The curtain airbag can include a mounting tab that includes a sleeve configured to receive the mounting plate of the mounting bracket.

According to another aspect, the mounting tab can include overlying panels that define the sleeve therebetween. The mounting plate can be positioned in the sleeve with curtain airbag material being positioned in the slot and the deployment plate being positioned outside the sleeve on an outboard side of the curtain airbag.

According to another aspect, the curtain airbag can have a stored condition in which an upper portion of the airbag includes a flip fold. A first portion of the flip fold can be positioned adjacent an upper surface of the deployment plate. A second portion of the flip fold can be positioned adjacent a lower surface mounting plate. A fold of the flip fold can extend around a terminal edge of the deployment plate.

According to another aspect, the curtain airbag in the stored condition can include a lower portion adjacent the flip folded upper portion, that is rolled up. The lower portion can be rolled in an outboard direction.

According to another aspect, the curtain airbag can be configured so that the mounting tabs and the mounting brackets are positioned adjacent vehicle structures for which avoidance during deployment of the curtain airbag is desired. According to another aspect, the vehicle structures can be one or more trim pieces of the vehicle. According to another aspect, the one or more trim pieces can be pillar trim pieces and/or roof rail trim pieces.

According to another aspect, the deployment plate can be configured to maintain an upper portion of the curtain airbag in a flip folded condition in the stored condition of the curtain airbag. The upper portion can be configured to unfold in a direction that causes the curtain airbag to avoid engagement with the one or more trim pieces.

According to another aspect, the flip folded portion of the curtain airbag can include a first portion positioned adjacent an upper surface of the deployment plate, a second portion positioned adjacent a lower surface mounting plate, and a fold that extends around a terminal edge of the deployment plate. According to another aspect, the curtain airbag in the stored condition can include a lower portion, adjacent the flip folded upper portion, that is rolled up. According to another aspect, the lower portion can be rolled in an outboard direction.

DRAWINGS

The foregoing and other features of the present disclosure will become apparent to one skilled in the art to which the present disclosure relates upon consideration of the following description with reference to the accompanying drawings, in which.

DESCRIPTION

Figure 1:
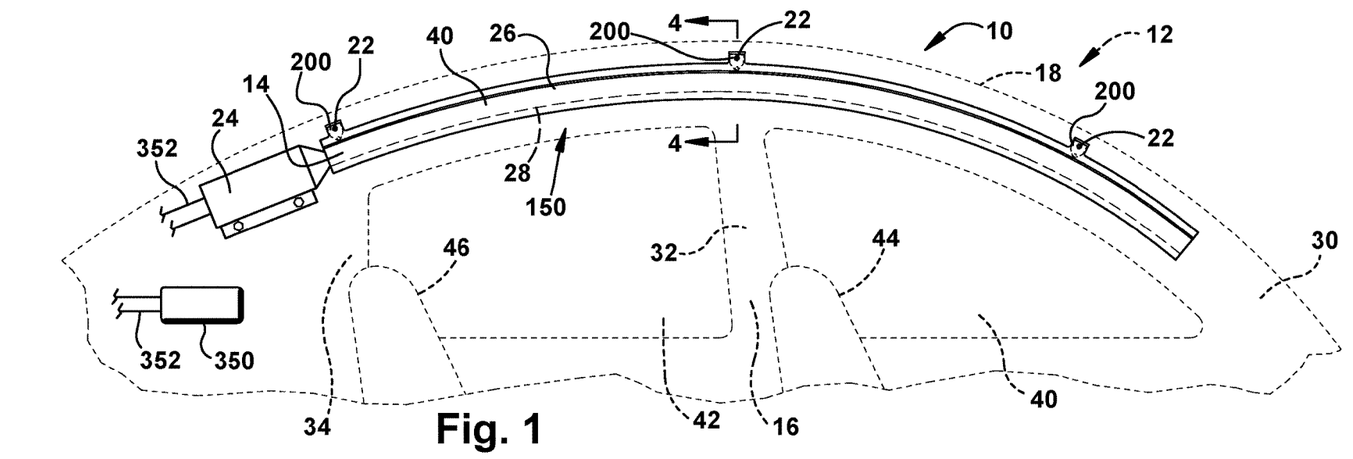
FIG. 1 is a schematic view of an apparatus for helping to protect a vehicle occupant illustrating the apparatus in a deflated and stored condition in a vehicle, according to the present invention.
Figure 2:
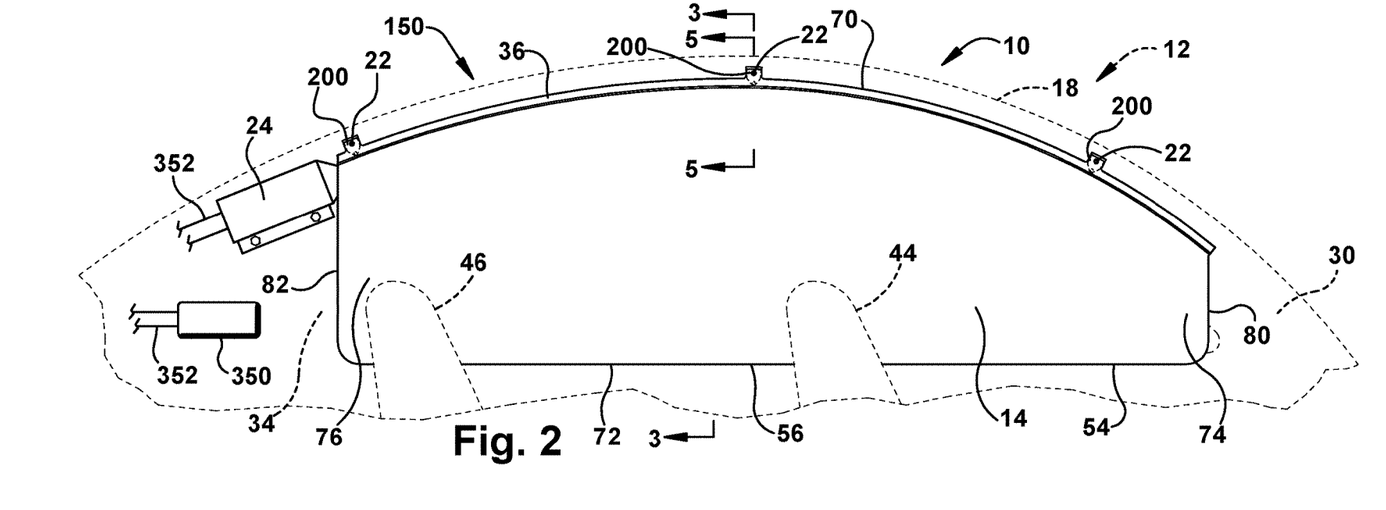
FIG. 2 is a schematic view of the apparatus of FIG. 1 in an inflated condition in the vehicle.

An example configuration of an apparatus 10 for helping to protect an occupant of a vehicle 12 is shown in FIGS. 1 and 2. The apparatus 10 includes an inflatable vehicle occupant protection device in the form of a curtain airbag 14 that is mounted adjacent the side structure 16 of the vehicle 12 and the roof 18 of the vehicle by a series of fasteners 22 spaced along its length. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42. This configuration is by way of example only. The vehicle 12 can have any configuration that implements a curtain airbag.

An inflator 24 is connected in fluid communication with the curtain airbag 14. The inflator 24 contains a stored quantity of pressurized inflation fluid in the form of a gas for inflating the curtain airbag 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the curtain airbag 14.

The apparatus 10 also includes a cover 26 (FIG. 1), such as a woven or nonwoven fabric sheath, that packages and helps support the curtain airbag 14 in a stored and deflated condition. The deflated curtain airbag 14 and the cover 26 have an elongated configuration and extend along the vehicle roof 18 and along the side structure 16 of the vehicle 12 above the side windows 40 and 42. The curtain airbag 14, packaged in the cover 26, along with the inflator 24, form an airbag module 150 that can be installed in the vehicle as a unit. To facilitate this installation, the airbag module 150 can be connected to the vehicle 12 at mounting tabs 200 that are spaced along an upper edge portion 70 of the curtain airbag 14.

Figure 3:
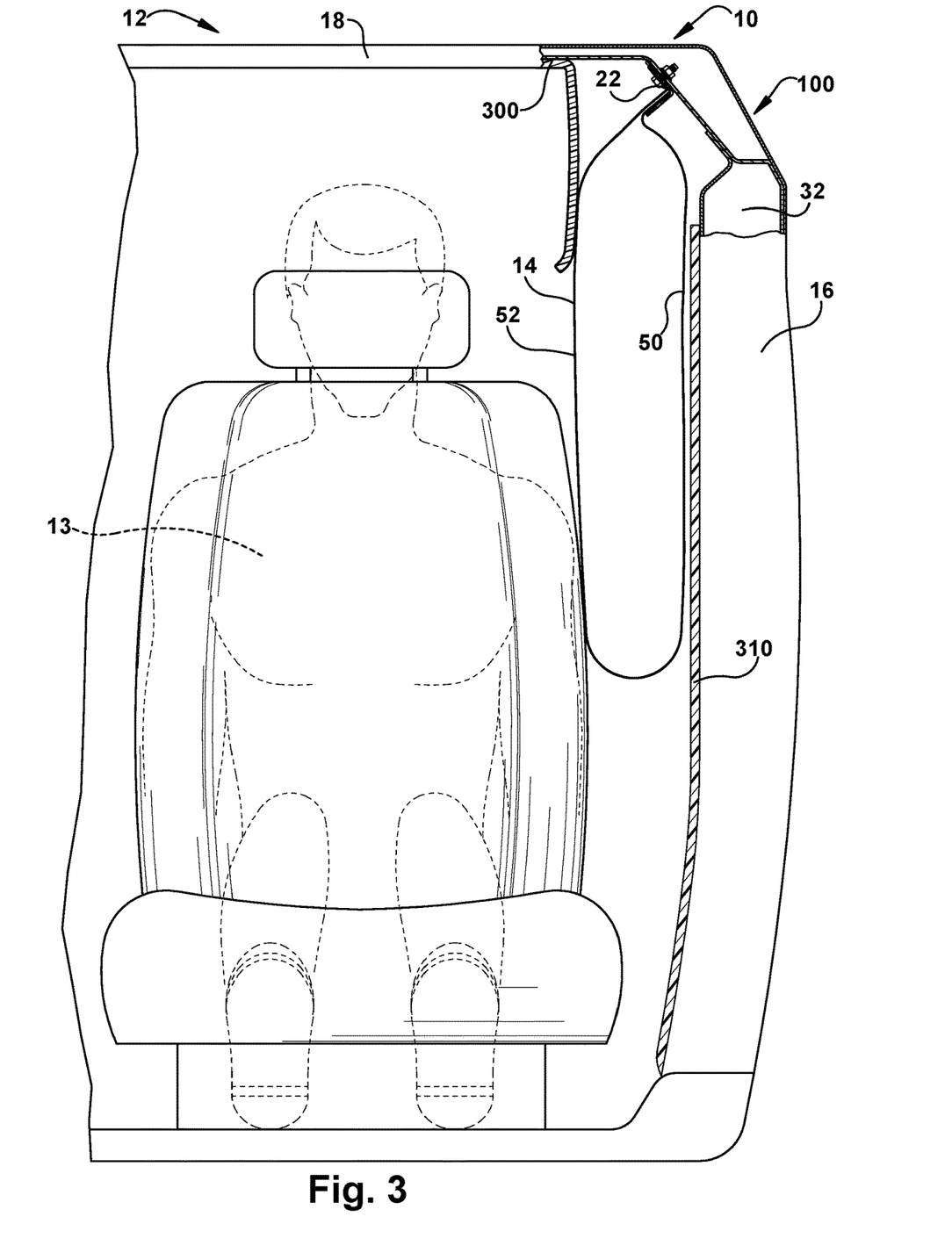
FIG. 3 is a sectional view taken generally along line 3-3 in FIG. 2.

The curtain airbag 14 (FIG. 3) includes panels 50 and 52 of material that are arranged in an overlying manner. Overlapping portions of the panels 50 and 52 are interconnected along at least a portion of a perimeter 54 of the curtain airbag 14 to form a perimeter connection 56 of the curtain. The perimeter connection 56 helps define an inflatable volume of the curtain airbag 14. The curtain airbag 14 may also include interior connections (not shown) in which the overlying panels 50 and 52 are interconnected within the perimeter 54 to form non-inflatable portions that help define inflatable chambers of the curtain. In the installed condition of the airbag module 150, the panel 50 is an outboard facing panel of the curtain airbag 14

The curtain airbag 14 may be formed in a variety of manners, such as by weaving the overlying panels 50 and 52 in a one piece woven (OPW) construction in which yarns (e.g., nylon or polyester yarns) are woven simultaneously to form both one layer and two layer portions of the airbag. The curtain airbag 14 could alternatively be formed from separately woven panels that are interconnected, for example, by stitching, ultrasonic welding, heat bonding, or adhesives. The curtain airbag 14 may be coated with a gas impermeable material, such as urethane, or laminated with a gas impermeable film. The curtain airbag 14 thus may have a substantially gas-tight construction. Those skilled in the art will appreciate that alternative materials, such as polyester yarn, and alternatives coatings, such as silicone, can also be used to construct the curtain airbag 14.

The perimeter 54 of the curtain airbag 14 is defined at least partially by an upper edge 70, an opposite lower edge 72 of the curtain, and front and rear portions 74 and 76, respectively, of the curtain airbag spaced apart horizontally along the upper and lower edges. The front and rear portions 74 and 76 of the curtain airbag 14 include front and rear edges 80 and 82, respectively, that are spaced horizontally apart along the upper and lower edges 70 and 72 and extend between the upper and lower edges. The shape and dimensions of the curtain airbag 14 can, of course, vary, depending on factors such as the architecture of the vehicle and the desired coverage of the airbag.

Upon the occurrence of an event for which occupant protection is desired, an airbag controller 350 actuates the inflator 24 via lead wires 352. The inflator 24 provides inflation fluid to the inflatable volume of the curtain airbag 14 to inflate and deploy the curtain airbag from the stored condition (see FIGS. 1 and 4) to the deployed condition (see FIGS. 2, 3, and 5). The curtain airbag 14 deploys in a generally downward direction, away from the roof 18, and becomes positioned between the side structure 16 of the vehicle and the occupant(s) 13 of the vehicle seats. In the example configuration illustrated in the figures, the curtain airbag 14, when in the deployed condition, covers a portion of the side structure 16 that includes portions of the A-pillar 30, B-pillar 32, and C-pillar 34 of the vehicle 12, and can help protect the occupant from impacts with the side structure and/or pillars.

Those skilled in the art will appreciate that the extent and coverage of the curtain airbag 14 in the vehicle 12 may vary. For example, the extent and coverage of the curtain airbag 14 may vary depending on a variety of factors, such as the architecture of the vehicle 12, the position of the curtain airbag in the vehicle, and the desired extent or coverage of the curtain airbag. The disclosure herein is not limited to any particular curtain airbag or airbag module, and can be applied to any curtain airbag or airbag module configuration.

Figure 4:
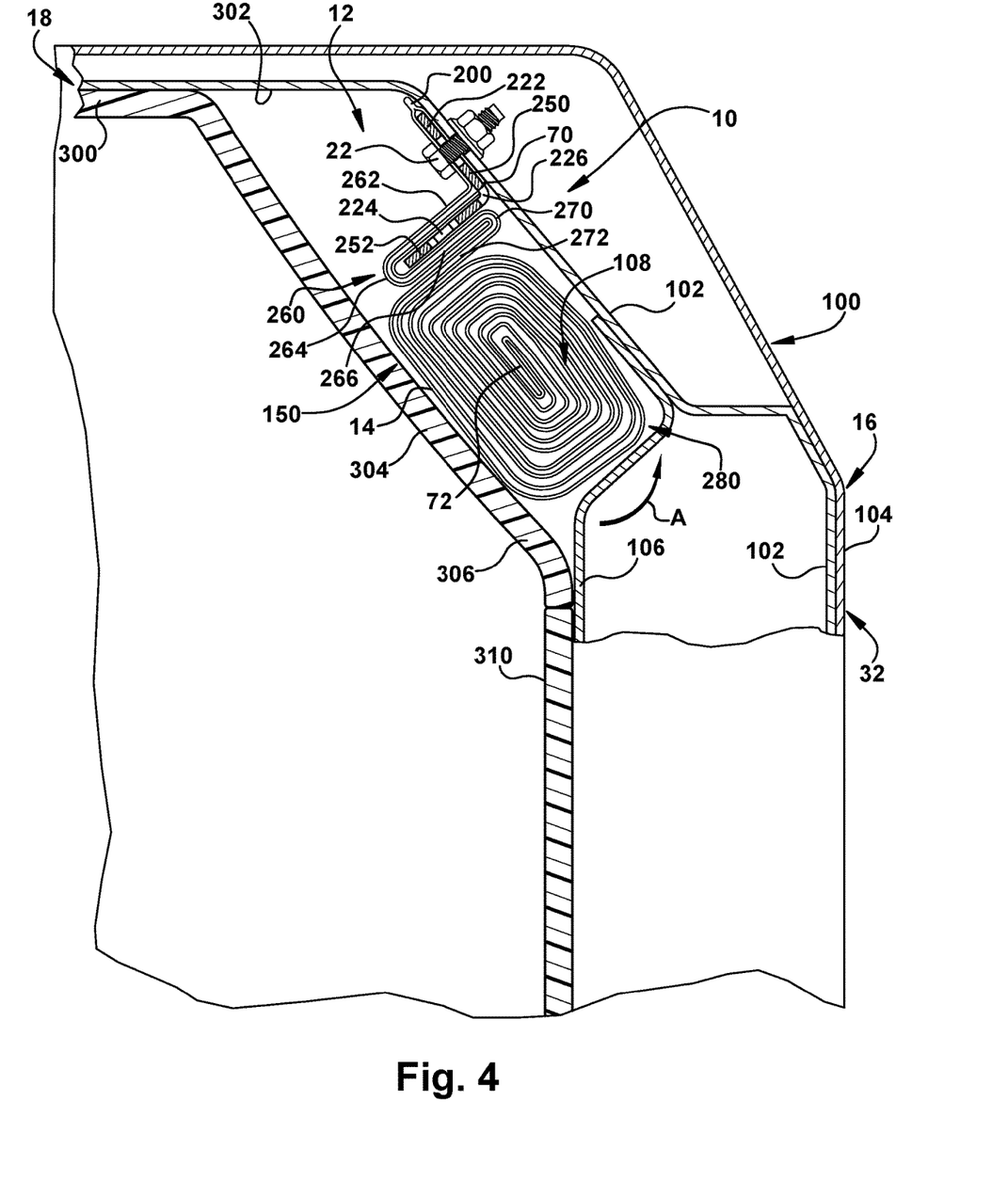
FIG. 4 is a sectional view taken generally along line 4-4 in FIG. 1.
Figure 5:
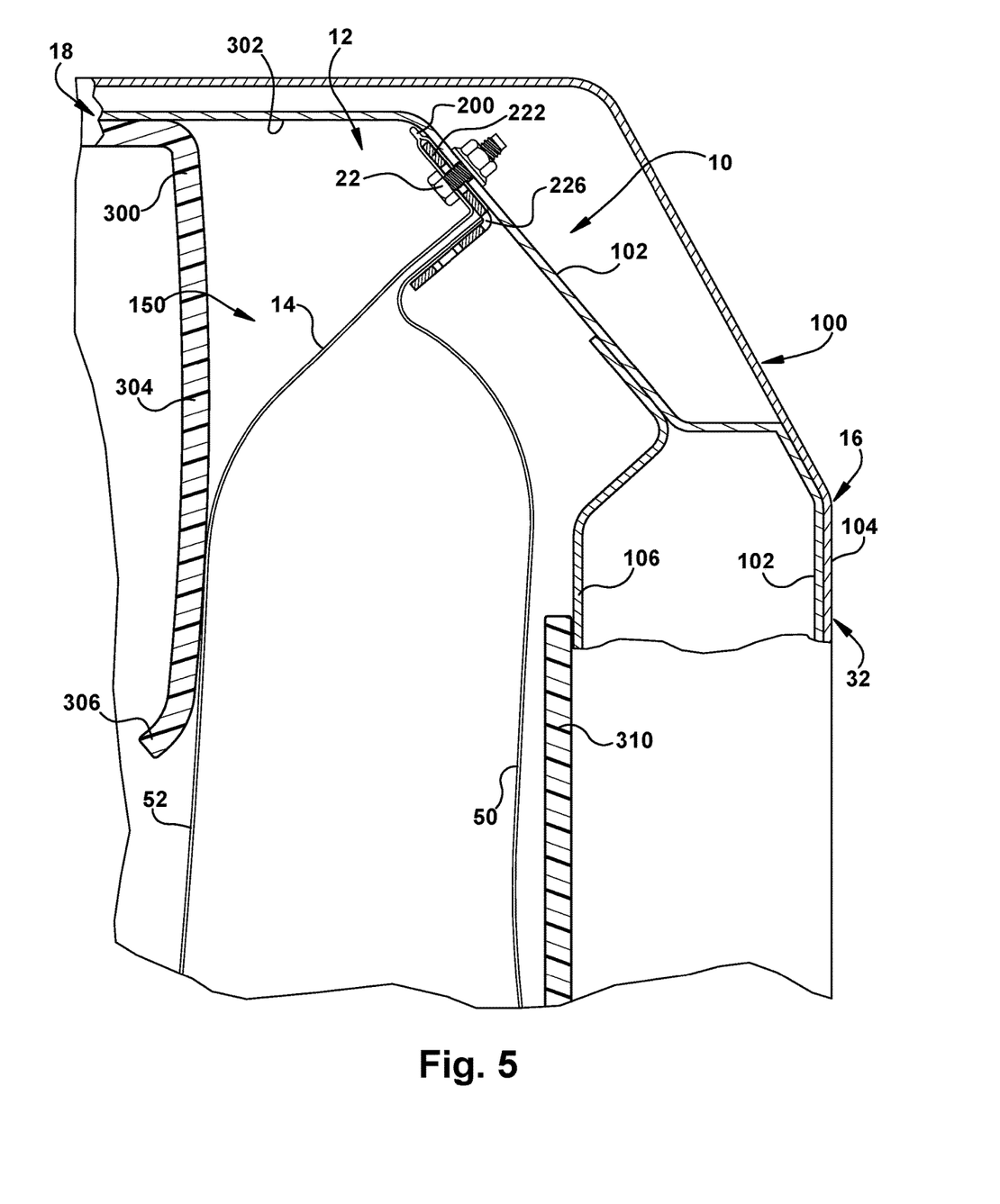
FIG. 5 is a sectional view taken generally along line 5-5 in FIG. 2.

The airbag module 150 is secured to the vehicle on or near a roof rail 100, which is formed at the intersection of the side structure 16 and the vehicle roof 18. Referring to FIGS. 4 and 5, the side structure 16, roof 18, and roof rail 100 are constructed of sheet metal that is connected, i.e., welded to form the architecture of the vehicle 12. The portion of the side structure 16 shown in FIGS. 4 and 5 includes the B-pillar 32 of the vehicle 12. Although FIGS. 4 and 5 are mere schematic representations shown as a non-limiting example construction, it can be seen that the side structure 16, roof 18, B-pillar 32, and roof rail 100 are formed from several panels 102, 104, 106. The airbag module 150 is connected to a panel of the roof rail 100 that extends at an angle between the side structure 16 and roof 18, in a pocket 108 defined by the sheet metal 102, 106 at the upper end of the B-pillar 32.

Mounted as shown, in a stored, pre-deployment condition, the airbag module 150 is concealed by a combination of structures, including the headliner 300, a roof rail trim piece 304, and a B-pillar trim piece 310. When the curtain airbag 14 inflates and deploys, it must displace some or all of these structures in order to reach the deployed position within the requisite timeframe.

In displacing these structures, there are competing factors at play. On one hand, it is important that the curtain airbag inflate and deploy as closely along the side structure 16 as possible due to the limited space between the side structure and the adjacent occupant. because the occupant is positioned close to this structure On the other hand, it is important that the inflating/deploying curtain airbag clears the headliner 300 and trim pieces 304, 310 so that it does not get caught or damaged during deployment. Chief among these concerns is that of engaging the B-pillar trim piece 310. If the curtain airbag 14 catches on the upper end of the trim piece 310, it can become damaged and lose pressurization. It also can get caught up by the trim piece 310 and inhibited from reaching full deployment in the requisite amount of time.

Avoiding these structures would suggest deploying the curtain airbag 14 along a more inboard trajectory, but that is counter to competing interest of deploying the airbag close to the side structure 16. To accommodate both of these interests, the curtain airbag 14 is configured to have a stored configuration in which the airbag is rolled and folded in a manner that produces an initial deployment movement so as to clear the trim pieces, followed by deployment movement that causes the airbag to follow along the side structure 16.

The airbag module 150 includes mounting brackets 220 that cooperate with the mounting tabs 200 to secure the curtain airbag 14 to the vehicle 12 via the fasteners 22. Advantageously, the mounting brackets 220 are configured to help maintain the curtain airbag 14 in a rolled/folded condition configured to produce the deployment characteristics described in the preceding paragraph. The mounting brackets 220 help maintain this rolled/folded condition of the curtain airbag 14 when packaged in the airbag module 150 and concealed by the headliner 300 and trim pieces 304, 310. This helps package the curtain airbag 14 in the airbag module 150 so that the module is configured as an installation-ready unit that simply requires fastening to the vehicle 12 via the mounting tabs 200 with the mounting brackets 220 installed therein.

Figure 6A:
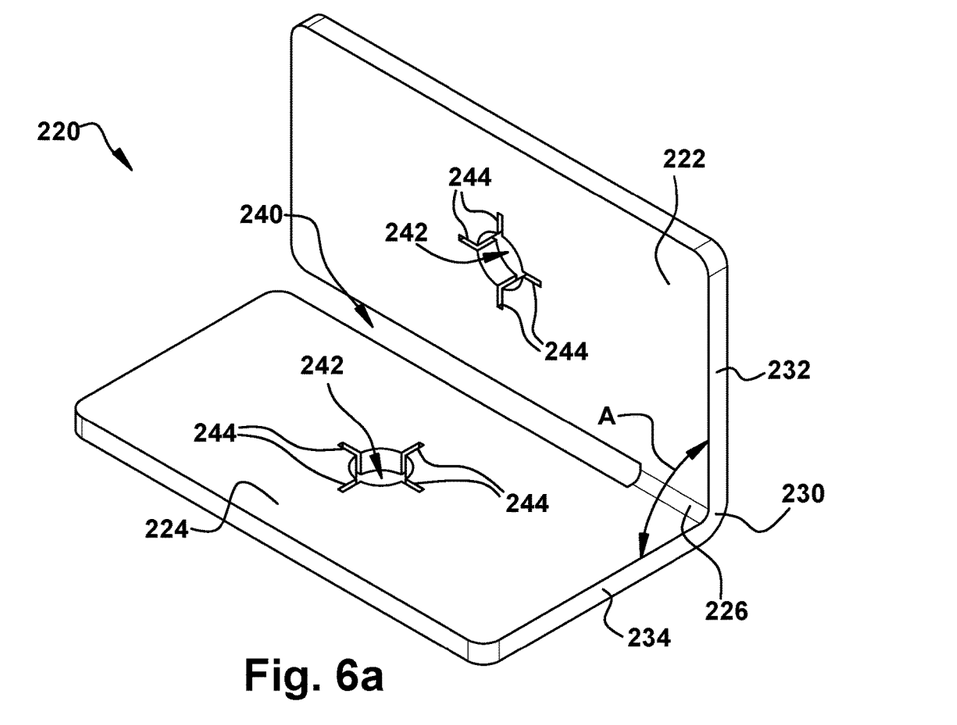
FIG. 6A is a perspective view illustrating a mounting bracket portion of the apparatus.
Figure 6B:
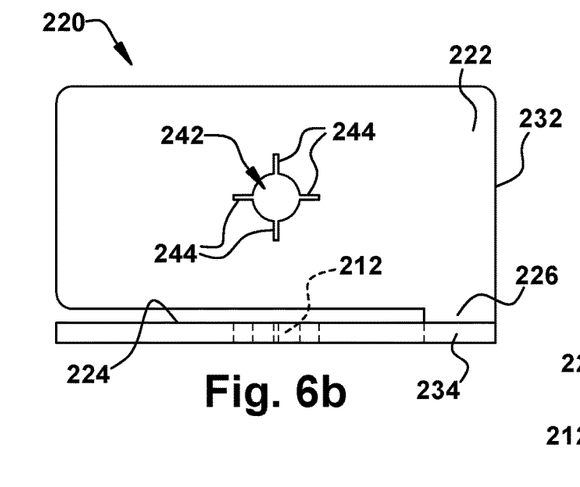
FIG. 6B is a front view of the mounting bracket of FIG. 6A.
Figure 6C:
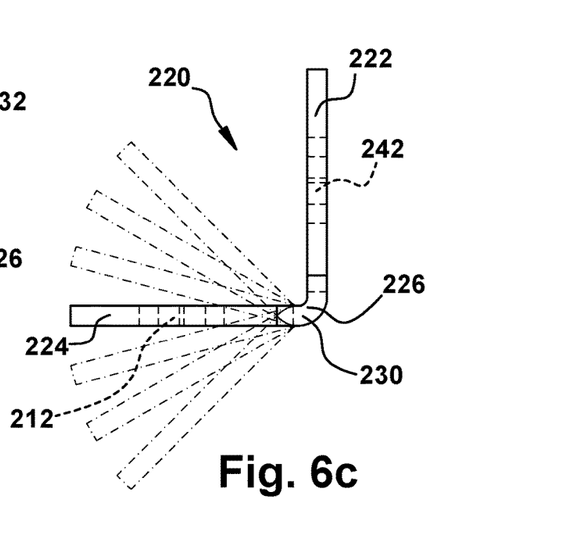
FIG. 6C is a side view of the mounting bracket of FIG. 6A.

Referring to FIG. 6, the mounting bracket 220 includes first and second bracket plates 222, 224, respectively, that are interconnected by an arm portion 226. The mounting bracket 220 can be bent or otherwise formed with a bend 230 of the arm portion 226 that results in the bracket plates 222, 224 extending at an angle, indicated generally at A, relative to each other. In the figures, the angle A is shown as being about 90 degrees. However, depending on factors such as the vehicle architecture and the orientation of the airbag module 150 when installed in the vehicle 12, the angle A can vary. This is shown, by way of example, in dashed lines in FIG. 6C, which shows various angles at which the first and second bracket plates 222, 224 can extend, based on the bend 230 in the arm portion 226.

The first and second bracket plates 222, 224 each have a generally planar, rectangular configuration with rounded corners. The arm portion 226 spaces the bracket plates 222, 224, forming a slot 240 that extends between the bracket plates. The arm portion 226 is spaced from at least one lateral edge of the bracket plates 222, 224 so that the slot 240 has an open end 246. In the example configuration illustrated in the figures, the arm portion 226 extends between aligned lateral edges 232, 234 of the bracket plates 222, 224 and forms a contiguous edge of the mounting bracket 220. Because of this, the slot 240 extends the width of the bracket plates 222, 224, minus the width of the arm portion 226.

The first and second bracket plates 222,224 each include a centrally located fastener opening 242 configured to receive a fastener, such as a bolt or screw, for fixing the bracket 220 and the airbag module 150 to the vehicle 12. Each fastener opening 242 has a generally circular configuration and can include slots 244 that extend radially from the opening. In the example configuration illustrated in the figures, the fastener opening 242 includes four slots 244 that extend in radial directions that are 90 degrees apart.

The slots 244 allow the fastener opening 242 to have a diameter configured to form an interference with the major diameter of the threaded shank portion of a threaded fastener so that the fastener can be retained in the opening due to the interference fit. The slots 244 allow portions of the bracket material between the slots to deflect in order to facilitate installing a threaded fastener in the fastener opening 242. This deflection and the resulting interference can retain the fastener 22 in the fastener opening 242 prior to and during installation of the airbag module 150.

In some instances that the slots 244 are not necessary and might not be included. For example, the slots 244 could be omitted and a retention washer could be installed on the fastener shank on the outboard side of the mounting tab 200. As another example, where fasteners are not shipped with the airbag module 150 assembly, but instead are added at the vehicle assembly plant, the slots 244 can be omitted.

The mounting bracket 220 has a high strength construction that can result from the use of a variety of materials. For example, the mounting bracket 220 can be formed of high-strength nylon plastic, high-density polyethylene (HDPE), polypropylene (PP), or a thermoplastic polyolefin (TPO). In this construction, the mounting bracket can have a molded construction so that the bracket plates 222, 224 and arm portion 226 can be formed as a one-piece component, which can improve the strength and integrity of the structure. The fastener openings 242 and slots 244 (if included) can be formed as a part of the molding or in a separate step, e.g., a stamp or punch step, after the bracket plates 222, 224 and arm portion 226 is formed.

In another construction, the mounting bracket 220 can have a metal, e.g., steel, construction in which the bracket plates 222, 224 and arm portion 226 can be stamped from a single metal piece and thereafter bent to form the mounting bracket 220 as a one-piece component. In this configuration, the fastener openings 242 and slots 244 (if included) can be formed along with the bracket plates 222, 224 and arm portion 226 in a single stamping step or in one or more separate stamping steps. This construction might be beneficial if the angle A between the bracket plates 222, 224 is meant to be adjustable, as this would entail a simple bending of the arm portion 226.

Figure 7:
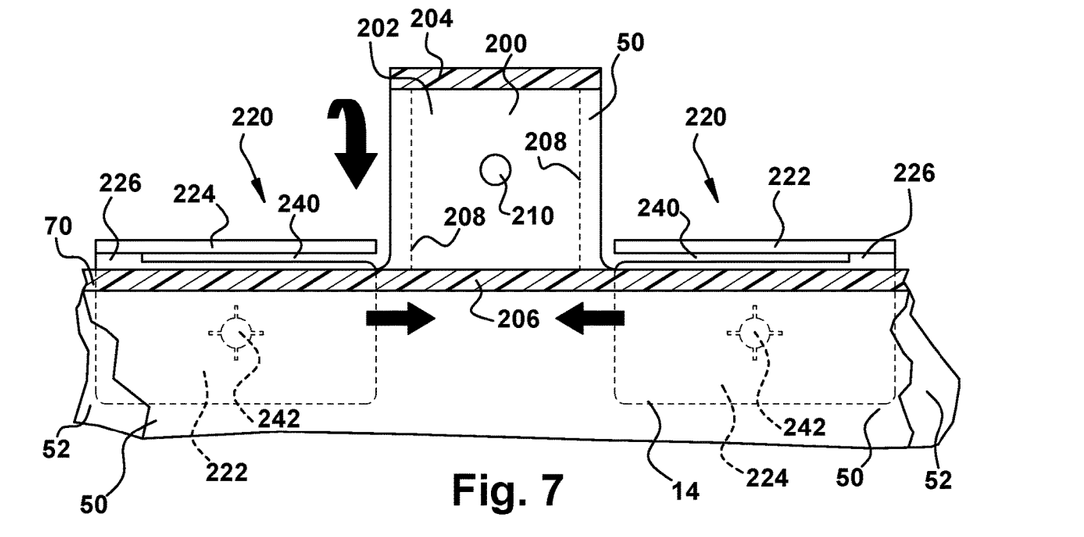
FIG. 7 is a front view illustrating the installation of the mounting bracket in a mounting tab of a curtain airbag.

Referring to FIG. 7, the curtain airbag 14 is configured to have a pocket or sleeve 202 in the area of the mounting tabs 200. The sleeve 202 is located between the overlying airbag panels 50, 52 in an area of the curtain airbag 14 that includes the mounting tabs 200 and a portion of the airbag located at the upper edge 70. The sleeve 202 is configured to receive the mounting bracket 220. Alternatively, the mounting tabs 200 could be configured with pockets, in which case one end of the sleeve 202 is closed. Closed pocket configurations of the mounting tabs 200 would therefore involve a closure of the sleeve 202 at one of the ends (left or right as shown in FIG. 7), which are indicated generally by dashed lines at 208 in FIG. 7. These closures could be formed by connections of the panels 50, 52, such as those discussed in the following paragraph.

The sleeve 202 is partially defined by connections 204, 206 of the panels 50, 52 at the periphery of the sleeve 202. In an OPW construction of the curtain airbag 14, the connections 204, 206 can be areas of single layer OPW material at the periphery of the sleeve. In a configuration where the panels are separate and assembled together, the connections 204, 206 can be stitching or welds that interconnect the panels 50, 52. The area of the connections 204, 206 between the panels 50, 52, whether it be a single layer OPW construction, a stitched construction, or a welded construction, is shown generally by areas of cross-hatching in FIG. 7. The width or thickness of the connections 204, 206 can be configured to be commensurate with the amount of stress experienced by the material during airbag deployment and the material properties of the airbag panels 50, 52.

The mounting tab 200 includes fastener openings 210 that extend through both layers 50, 52 of the airbag material. The fastener openings 210 are configured to receive the fastener 22 that connects the airbag module 150 to the vehicle 12 at the location of the mounting tab 200. The fastener openings 210 are therefore configured to align with the fastener opening 242 in the mounting bracket 220 when the bracket is installed in the sleeve 202.

The mounting bracket 220 is configured to be installed in the sleeve 202 in order to reinforce the mounting tab 200 and to facilitate packaging and installation of the airbag module 150 in the vehicle 12. The mounting bracket 220 is inserted into the sleeve 202 between the layers 50, 52, as indicated generally by the arrows in FIG. 7. As shown in FIG. 7, the mounting bracket 220 can have a reversible or ambidextrous configuration that allows for installing the bracket from either end, left or right as viewed in the figure, of the mounting tab 200.

FIG. 7 shows the ambidextrous left/right directions in which the mounting bracket 220 can be installed. During installation, the mounting bracket 220 and the curtain airbag 14/mounting tab 200 are maneuvered so that the bracket plate 222, 224 that is not positioned in the mounting tab is positioned behind the curtain airbag 14, i.e., is outboard of the curtain airbag as viewed in FIG. 8. To do this, the mounting tab 200 can be folded forward, i.e., out of the page as viewed in FIG. 7, as indicated generally by the curved arrow in FIG. 7, so as to be positioned to receive the bracket plate (plate 224 for left insertion, plate 222 for right insertion) while the other plate is positioned behind/outboard the airbag 14. In FIG. 7, the mounting tab 200 is shown in an unfolded/flat condition continuous with the curtain airbag 14 for purposes of clarity in illustration, with the curved arrow indicating the folding of the tab for bracket installation.

As can be seen in FIG. 7, to install the mounting bracket 220 from the right end of the mounting tab 200, the first bracket plate 222 is installed in the sleeve 202. When this is done, the first bracket plate 222 enters the slot 240 and the second bracket plate 224 is positioned outside the sleeve 202, adjacent the panel 52, i.e., behind the curtain airbag 14 as viewed in FIG. 7 or outboard of the curtain airbag as viewed in FIG. 8. Once inserted, the mounting bracket 220 is maneuvered until the fastener opening 242 in the first bracket plate 222 is aligned with the fastener opening 210 of the mounting tab 200 (see FIG. 8). In this installation, the fastener opening 242 of the second bracket plate 224 goes unused.

To install the mounting bracket 220 from the left end of the mounting tab 200, the bracket is flipped, so that the second bracket plate 224 is installed in the sleeve 202. When this is done, the second bracket plate 224 enters the slot 240 and the first bracket plate 222 is positioned outside the sleeve 202, adjacent the panel 52, i.e., behind the curtain airbag 14 as viewed in FIG. 7 or outboard of the curtain airbag as viewed in FIG. 8. Once inserted, the mounting bracket 220 is maneuvered until the fastener opening 242 in the second bracket plate 224 is aligned with the fastener opening 210 of the mounting tab 200 (see FIG. 8). In this installation, the fastener opening 242 of the first bracket plate 222 goes unused.

Figure 8:
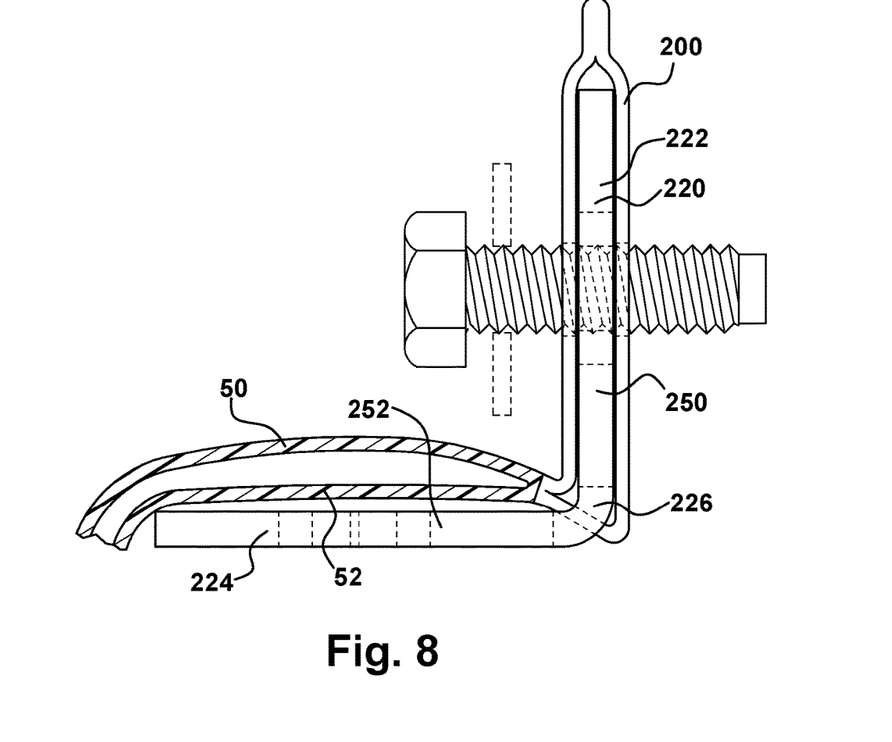
FIG. 8 is a side view, partially in section, illustrating the mounting bracket installed in a mounting tab of a curtain airbag.

From the above, it will be appreciated that the bracket plate installed in the sleeve 202 acts as a mounting plate for the airbag module 150, while the other bracket plate serves as a deployment plate for helping to control the deployment trajectory of the curtain airbag in the vehicle 12. For purposes of clarity, in describing the mounting bracket 220 in this regard, reference will be made to a mounting plate 250 and a deployment plate 252. Referring to FIGS. 4 and 8, the first bracket plate 222 is the mounting plate 250, and the second bracket plate 224 is the deployment plate 252.

As mentioned previously, the deployment plate 252 helps maintain the stored condition of the curtain airbag 14 prior to deployment. As shown in FIG. 4, in the stored condition, the curtain airbag 14 is both rolled and folded. More specifically, in the stored condition, the curtain airbag 14 is flip-folded and rolled. The flip fold is shown at 260 and the roll at 280 in FIG. 4. The flip fold 260 is formed at the upper end of the curtain airbag 14, i.e., along the upper edge 70 of the airbag, and the roll 280 is formed beneath the flip fold, by rolling up the airbag up from the lower edge 72 until it reaches the flip fold.

The flip fold 260 is a back-and-forth fold, which can be referred to as a Z-fold. The flip fold 260 has three portions defined by two folds. A first portion 262 of the flip fold 260 extends above and along an upper surface of the deployment plate 252 to a first fold 264, which wraps around the inboard edge of the deployment plate. A second portion 266 of the flip fold 260 extends along a lower surface of the deployment plate 252 to a second fold 270 positioned adjacent or near the outboard edge of the deployment plate. A third portion 272 of the flip fold extends back along the second portion 266, and marks the interface between the flip fold 260 and the roll 280.

To achieve the positioning of the deployment plate 252 between the first and second portions 262, 266 of the flip fold 260, the mounting bracket 220 needs to be installed so that the deployment plate is positioned on an outboard side (OB) of the curtain airbag 14, as opposed to the inboard (IB) side of the curtain airbag. This requires careful positioning and maneuvering of the mounting bracket 220 during the installation procedure shown in FIG. 7. Specifically, as shown in FIG. 8, the mounting tab 200 needs to be folded at or about the connection 206 so that the deployment plate 252 is positioned on the outboard side OB of the curtain airbag 14, i.e., adjacent the outboard panel 52, when the mounting plate 250 is installed in the sleeve 202.

The roll 280 illustrated in FIG. 4 is an outboard roll, meaning that the roll is configured/constructed by initially rolling the lower edge 72 of the curtain airbag 14 in a direction that is outboard toward the vehicle side structure 16 as viewed in the installed condition of the airbag module 150, i.e., as shown by arrow A in FIG. 4. This produces an unrolling motion during deployment that is inboard, i.e., away from the side structure 16. Of course, the folded and rolled condition of the curtain airbag shown in FIG. 4 is not meant to be limiting, as the deployment plate 252 can be used to help maintain alternative folded and/or rolled conditions of the curtain airbag 14.

Advantageously, the aforementioned rolled and folded configuration of the airbag 14, maintained by the mounting brackets 220, is configured to avoid interference from trim pieces during airbag deployment by controlling the deployment trajectory and positional timing. The rolled and folded configuration of the airbag 14 can also help minimize interaction with the headliner 300, although some interaction is inevitable. The flip fold 260, positioned along the upper edge 70 of the curtain airbag 14 is among the first portions of the airbag to receive inflation fluid from the inflator 24. When this occurs, the flip fold 260 unfolds. Due to the arrangement of the flip fold 260, the unfolding of the curtain airbag 14 along the fold 264 causes the remainder of the airbag below the fold, including the roll 280, to move along an inboard trajectory at an early stage in the deployment event. This trajectory and timing control helps the curtain airbag 14 avoid interaction with the B-pillar trim piece 310.

Having initially moved inboard, the rolled portion 280 begins to unroll in the direction opposite that which it was rolled-up. Viewing FIG. 4, having initially cleared the trim piece 310, the roll 280 unrolls in an outboard direction toward the side structure 16. This unrolling direction helps ensure that the trajectory of the deploying curtain airbag 14 is along the side structure, either close to or in engagement with the trim piece 310. This helps ensure that the curtain airbag 14 is inflated and fully deployed and pressurized in sufficient time to help protect the occupant.

The mounting brackets 220, particularly the deployment plates 252, help maintain the flip fold along the upper edge 70 of the curtain airbag 14 during assembly and installation. Because the airbag module 150 is a soft-pack, meaning that there is no rigid self-supporting structure, such as a plastic housing, along its length to maintain its form. The only support is the fabric cover 26, which packages the curtain airbag 14 but does not enforce rolled and flip-folded configuration thereof. During installation, the soft cover 26 can be bent, twisted and otherwise manipulated, which could compromise the rolled and flip-folded configuration of the curtain airbag 14 inside.

Advantageously, the mounting brackets 220 maintain and enforce the flip fold, especially at the locations where it is most important, such as adjacent pillar trim pieces. In fact, the location and arrangement of the brackets 220 could be configured based on the specific architecture of the vehicle in which the airbag module 150 is installed, so as to avoid airbag deployment interference from trim pieces, or any structure for that matter, specific to that particular vehicle.

From the above description of the invention, those skilled in the art will perceive improvements, changes and modifications. Such improvements, changes and modifications within the skill of the art are intended to be covered by the appended claims.

Having described the invention, the following is claimed:

1. A mounting bracket for a curtain airbag, comprising:
   a mounting plate configured to be installed in a mounting tab of a curtain airbag, the mounting plate comprising an opening for receiving a fastener;
   a deployment plate configured to be installed between folded portions of the curtain airbag and to maintain a folded configuration of the folded portions; and
   an arm portion that connects the deployment plate to the mounting plate and maintains the deployment plate spaced from the mounting plate at a predetermined orientation relative to the mounting plate; and
   a slot defined between the mounting plate and the deployment plate and having an open end adjacent corresponding lateral edges of the mounting plate and the deployment plate, wherein the arm portion defines a closed end of the slot opposite the open end.

2. The mounting bracket recited in claim 1, wherein the arm portion extends between and connects lateral edges of the mounting plate and the deployment plate opposite the open end of the slot.

3. The mounting bracket recited in claim 1, wherein the deployment plate comprises an opening for receiving a fastener, the mounting bracket having a reversable configuration in which an identity of the mounting plate and the deployment plate is determined by which of the plates is installed in the mounting tab.

4. The mounting bracket recited in claim 3, wherein the mounting plate and the deployment plate have identical configurations.

5. The mounting bracket recited in claim 1, wherein the arm portion is configured to control the angle and orientation of the deployment plate relative to the mounting plate.

6. The mounting bracket recited in claim 5, wherein the arm portion is configured to allow the angle and orientation of the deployment plate relative to the mounting plate to be adjusted to account for varying vehicle architectures.

7. The mounting bracket recited in claim 1, wherein the deployment plate is configured to be positioned outboard of the curtain airbag when the mounting plate is installed in the mounting tab.

8. The mounting bracket recited in claim 1, wherein a lower portion of the mounting tab is received in the slot when the mounting plate is installed in the mounting tab.

9. An airbag module comprising:
   a curtain airbag inflatable away from a roof of a vehicle to a deployed position between a side structure of the vehicle and a vehicle occupant;
   an inflator actuatable to supply inflation fluid to the curtain airbag to inflate and deploy the airbag; and
   the mounting bracket recited in claim 1, wherein the curtain airbag comprises the mounting tab into which the mounting plate is configured to be installed, the mounting tab comprising a sleeve configured to receive the mounting plate of the mounting bracket.

10. The airbag module recited in claim 9, wherein the mounting tab comprises overlying panels that define the sleeve therebetween, the mounting plate being positioned in the sleeve, with curtain airbag material being positioned in the slot, and the deployment plate being positioned outside the sleeve on an outboard side of the curtain airbag.

11. The airbag module recited in claim 10, wherein the curtain airbag has a stored condition in which an upper portion of the airbag comprises a flip fold, wherein a first portion of the flip fold is positioned adjacent an upper surface of the deployment plate, a second portion of the flip fold is positioned adjacent a lower surface of the deployment plate, and a fold of the flip fold extends around a terminal edge of the deployment plate.

12. The airbag module recited in claim 11, wherein the curtain airbag in the stored condition includes a lower portion adjacent the flip folded upper portion, that is rolled up.

13. The airbag module recited in claim 12, wherein the lower portion is rolled in an outboard direction.

14. The airbag module recited in claim 9, wherein the curtain airbag is configured so that the mounting tab and the mounting-bracket are positioned adjacent vehicle structure for which avoidance during deployment of the curtain airbag is desired.

15. The airbag module recited in claim 14, wherein the vehicle structure comprises one or more trim pieces of the vehicle.

16. The airbag module recited in claim 15, wherein the one or more trim pieces comprise at least one of pillar trim pieces and roof rail trim pieces.

17. The airbag module recited in claim 14, wherein the deployment plate is configured to maintain an upper portion of the curtain airbag in a flip folded condition in a stored condition of the curtain airbag, wherein the upper portion is configured to unfold in a direction that causes the curtain airbag to avoid engagement with the one or more trim pieces.

18. The airbag module recited in claim 17, wherein the flip folded portion of the curtain airbag comprises a first portion positioned adjacent an upper surface of the deployment plate, a second portion positioned adjacent a lower surface of the deployment plate, and a fold that extends around a terminal edge of the deployment plate.

19. The airbag module recited in claim 18, wherein the curtain airbag in the stored condition includes a lower portion, adjacent the flip folded upper portion, that is rolled up.

20. The airbag module recited in claim 19, wherein the lower portion is rolled in an outboard direction.

* * * * *